US007957363B2

(12) United States Patent
Deen et al.

(10) Patent No.: US 7,957,363 B2
(45) Date of Patent: Jun. 7, 2011

(54) SYSTEM, METHOD, AND SERVICE FOR DYNAMICALLY SELECTING AN OPTIMUM MESSAGE PATHWAY

(75) Inventors: Robert Glenn Deen, San Jose, CA (US); James Harvey Kaufman, San Jose, CA (US); Tobin Jon Lehman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 11/139,799

(22) Filed: May 26, 2005

(65) Prior Publication Data

US 2006/0268712 A1 Nov. 30, 2006

(51) Int. Cl.
*H04L 12/28* (2006.01)
(52) U.S. Cl. ...................................................... 370/351
(58) Field of Classification Search .................. 370/229, 370/351, 235, 389, 392; 709/201, 203, 223, 709/227–228, 238–244
See application file for complete search history.

(56) References Cited

U.S. PATENT DOCUMENTS

| | | | | |
|---|---|---|---|---|
| 5,794,039 A * | 8/1998 | Guck | ............. | 707/103 R |
| 6,185,612 B1 | 2/2001 | Jensen et al. | | |
| 6,389,479 B1 * | 5/2002 | Boucher et al. | ............. | 709/243 |
| 6,424,992 B2 * | 7/2002 | Devarakonda et al. | ...... | 709/203 |
| 2001/0047401 A1 * | 11/2001 | McTernan et al. | ............ | 709/219 |
| 2002/0023143 A1 * | 2/2002 | Stephenson et al. | .......... | 709/218 |
| 2002/0052968 A1 | 5/2002 | Bonefas et al. | | |
| 2003/0120802 A1 * | 6/2003 | Kohno | .......................... | 709/237 |
| 2003/0123639 A1 * | 7/2003 | Lee | .................................. | 379/258 |
| 2003/0202476 A1 | 10/2003 | Billhartz et al. | | |
| 2003/0233540 A1 * | 12/2003 | Banerjee et al. | ............. | 713/153 |
| 2004/0028069 A1 * | 2/2004 | Tindal et al. | .................. | 370/429 |
| 2004/0078619 A1 * | 4/2004 | Vasavada | .......................... | 714/4 |
| 2004/0078625 A1 * | 4/2004 | Rampuria et al. | ................ | 714/4 |
| 2004/0162996 A1 * | 8/2004 | Wallace et al. | ............... | 713/201 |
| 2006/0133307 A1 * | 6/2006 | Fukasawa et al. | ............ | 370/328 |
| 2007/0263628 A1 * | 11/2007 | Axelsson et al. | ............. | 370/392 |
| 2008/0096595 A1 * | 4/2008 | Klassen et al. | ................ | 455/466 |
| 2008/0279106 A1 * | 11/2008 | Goodfellow et al. | ......... | 370/238 |

FOREIGN PATENT DOCUMENTS

JP 10243016 A 9/1998

* cited by examiner

*Primary Examiner* — Derrick W Ferris
*Assistant Examiner* — Omar Ghowrwal
(74) *Attorney, Agent, or Firm* — Shimokaji & Assoc.; Samuel Kassatly

(57) ABSTRACT

A message pathway selection system dynamically selects an optimum message pathway for transmitting messages. The system dynamically optimizes a message pathway according to various criteria such as, for example, efficiency, economy, data requirements, auditing requirements, security, data size, etc. The system can direct a message to bypass an infrastructure messaging server, using a direct message pathway. The system can also switch from an infrastructure messaging server to a direct method. The system can also utilize an infrastructure messaging pathway either as an alternative or in parallel with the direct message pathway. The system allows an application to use a single communication system for both a direct mode and an infrastructure mode of data transfer. The present system can bypass the infrastructure message pathway, thus reducing message latency, number of messages sent, and improving overall bandwidth.

19 Claims, 6 Drawing Sheets

SYSTEM, METHOD, AND SERVICE FOR DYNAMICALLY SELECTING AN OPTIMUM MESSAGE PATHWAY

FIELD OF THE INVENTION

The present invention generally relates to data transmission over a network. More particularly, the present invention relates determining a pathway for optimum data transmission over a direct peer-to-peer connection, or an infrastructure system based on a variety of predetermined criteria.

BACKGROUND OF THE INVENTION

The movement of data between machines on a network is a fundamental action in computing. Such distributed systems are typically designed to use one of two systems: an infrastructure messaging system or a peer-to-peer messaging system (also commonly referenced as a point-to-point messaging system). The infrastructure messaging system sends a message as either structured or unstructured data; the message is delivered using a separate server. The peer-to-peer messaging system sends a message as either a structured or unstructured data; the message is delivered via a conduit established directly between the sending and receiving computers. The WWW (World Wide Web) is an example of a peer-to-peer messaging system using http protocol to exchange data from one point to another.

Examples of the infrastructure messaging system comprise servers or intermediaries such as, for example, the MQ SERIES®, JETSTREAM®, or TSPACES® infrastructure messaging systems. The intermediary server operates as a temporary holding area for messages, which guarantees that the messages will not be discarded until they are safely delivered to the recipient. Compared to the peer-to-peer messaging system, the infrastructure messaging system typically comprises more features and is easier to manage or administer. However, the infrastructure messaging system generally incurs some performance overhead.

The peer-to-peer messaging system usually has better performance compared to the infrastructure messaging system. However, the overall peer-to-peer messaging system is generally more difficult to administer or manage as a whole, due to decentralization. Peer-to-peer networks often intentionally promote distributed independent management.

Peer-to-peer messaging systems allow fast data transfer; the only limiting factor in data transfer is the speed of the sending systems, the receiving systems, and the communications network linking the sending and receiving systems. Peer-to-peer communication further requires only moderate administration effort for the few parties involved. For example, in a two-computer connection, only the two computers involved in the data exchange need to be configured to establish, use, and terminate the data exchange connection.

In contrast to peer-to-peer messaging systems, the infrastructure messaging systems allow senders and receivers (further referenced as clients) to connect, disconnect, and reconnect without loss of messages. An infrastructure system supporting the infrastructure messaging system receives messages for a client and delivers the messages when the client is connected. If the client is not connected, the message may be stored by the infrastructure system and delivered at a time when client is connected.

The infrastructure messaging systems commonly comprise other features such as multi-phase commit transactions, more than one receiver per single message, persistence, audit trails, and fault tolerance. However, the infrastructure required to support this form of data exchange imposes overhead in the infrastructure messaging system, taking the form of both an increase in the latency of messages and the rate of data movement. Message latency is the time that elapses from sending a message to fully receiving the message. The rate of data movement is the amount of data transmitted over the time required to move the data between sender and receiver. The benefits of the infrastructure messaging systems incur reduced speed and increased administrative needs. Further, infrastructure messaging systems often have limits on how much data can be stored in the message storage area.

Although the technologies described above have proven to be useful, it would be desirable to present additional improvements. There are situations where a communication model that allows optimal selection of either the infrastructure messaging system or the peer-to-peer messaging system would be desirable. For example, a communications system can provide a video feed to a number of customers. The communications system provides to the customers ability to register for the video feed, turn the video feed on and off, select among various video feeds, adjust the video feed speed and characteristics, etc. These control messages can be easily exchanged over an infrastructure messaging system because the control messages are small. The video feed is not appropriate for the infrastructure messaging system because of size. Rather, the video feed is best transmitted using point-to-point messaging system.

Using conventional methods, it is possible for an application to employ two or more communication schemes in a single system. However, conventional approaches require a client to statically select a communication method per specific connection; it is unlikely that a client is listening via more than one communication mechanism for the same message. A static connection forces certain behavior on some connections but not others. For example, peer-to-peer connections do not provide message persistence; consequently, all messages sent on a connection dedicated to peer-to-peer transmission have no persistence.

Moreover, differences in message payload requirements of different messaging systems can make it difficult or even impossible to send the same complex object (defined by the client application) via the various message systems. Consequently, a message sent over different systems is prepared differently. Alternatively, a generic messaging system can use the greatest common denominator in terms of message features to send a message over both peer-to-peer messaging systems and infrastructure messaging systems. However, this approach eliminates many of the useful messaging features available when using either the peer-to-peer messaging system or the infrastructure messaging system. Adding to a distributed system the complexity of additional messaging systems with different characteristics is a very complicated approach to optimizing message pathway.

Thus, there is needed a system, method, and service for dynamically selecting an optimum message pathway for transmitting messages using a single system with a single interface that can operate in an infrastructure messaging format, a peer-to-peer messaging format, or any other data transport format, and can also dynamically select a messaging format according to a variety of criteria. The need for such a solution has heretofore remained unsatisfied.

SUMMARY OF THE INVENTION

The present invention satisfies this need, and presents a system, a service, a computer program product, and an associated method (collectively referred to herein as "the system"

or "the present system") for dynamically selecting an optimum message pathway for transmitting messages. The present system dynamically selects an optimum message pathway according to various criteria such as, for example, efficiency, economy, data requirements, auditing requirements, security, data size, etc. The present system can direct a message to bypass an infrastructure messaging server, provided a sending client and a receiving client are in a proper mode to exchange messages directly over a direct message pathway. Otherwise, system 10 can utilize an infrastructure-based communication mechanism over an infrastructure messaging pathway.

When the sending client and the receiving client are not in the proper mode to exchange a message directly, the present system routes the messages through the infrastructure messaging server using an infrastructure messaging pathway {further referenced herein as the infrastructure mode). Furthermore, the present system realizes the benefits of using the infrastructure messaging server even when the infrastructure messaging server is bypassed, usually at a much smaller cost than using the infrastructure messaging server directly.

The direct communication of the present system supports many communication modes such as, for example, broadcast, multicast, peer-to-peer (also known as the direct mode), multi-receive, and publish/subscribe. The present system operates in a direct mode, utilizing a direct messaging pathway that is a common mode of data transport for clients that are sending messages to specific destinations. Operating in the direct mode implies that the sending client and the receiving client are in agreement that messages will be exchanged.

The direct mode is a special case of asynchronous communication mechanisms such as, for example, tuplespace systems, where much of the communication is anonymous and content based. Asynchronous communication mechanisms are multi-receive, meaning it is the receiver, not the sender, that determines who gets the message(s). Messages are not specifically addressed to a recipient. Multi-receive messaging is a more general form of queue-oriented communication, compared to systems that support the Java messaging Service (JMS), which usually explicitly identify both sides of a conversation.

Different types of infrastructure messaging servers set up the direct connection in different ways. For example, in the JMS PRODUCTS messaging system, setting up the direct connection involves building a channel between the sending client and the receiving client(s). In the TSPACES messaging system, a receiving client registers with the message server to be notified if any tuples (i.e., messages) are sent matching a certain format or content. The requesting notification can be made even more specific if the sending client also includes its name in the message. The specific addressing can happen in either direction. A sender can address a message specifically to a recipient by including the recipient's name in the message. The sender can make it even more personal by including in the sender's name which helps the recipient create a directed answer. The sender can also send a general message and include his or her name, thus allowing recipients to listen for messages with a certain content or for messages from that sender.

When using the present system for direct connections (for example, IBM's DIRECT CONNECT messaging system, IBMDC), a sending client is explicit in their intent. When the sending client specifies the intended message recipient (the receiving client), a peer-to-peer connection is created. Then, while the connection remains valid, any message write calls go directly to the receiving client over the direct message pathway rather than flow through the message infrastructure server. Thus, even though the sending client or sending application uses the standard infrastructure-based messaging interface, the program libraries that are part of the IBMDC messaging system are able to reroute the message directly to the program libraries of the receiving client, bypassing the infrastructure entirely. The faster route of the direct mode is used by the present system when the network connection is present and stable and when the user has declared that the direct mode is either desired or allowed. The more robust route of the infrastructure-based mode is used by default or when the extra features of the infrastructure-based mode are required.

The present system allows an application on a sending client to use a single communication system for both direct mode and infrastructure mode of data transfer. The present system allows the application flexibility to choose whether to select an optimized message pathway for data transfer. The present system can bypass the infrastructure message pathway, thus reducing message latency, number of messages sent, and improving overall bandwidth.

The present system creates a faster message path between the sending client and the receiving client(s). The present system further creates independent message routes that can be used differently. For example, a fast route using the direct mode can be used for high volume jobs such as, for example, streaming, while the slower route using the infrastructure mode can be used, for example, for encryption keys, validation codes, or metadata information.

A second connection created in infrastructure mode by the present system can be used as an alternative message path or as a backup (fault-tolerant) message path when a message fails to be delivered in direct mode. Conversely, the second connection can be used as an alternative pathway to the infrastructure server in the event that the connection from the client to the infrastructure server is severed while the peer-to-peer connection is still open. This alternate pathway is useful in wireless or mobile environments.

Using the present system, two clients communicating in direct mode (i.e., peer-to-peer clients) can start up a communication server on another machine to dynamically add or create the "infrastructure" connection to an otherwise peer-to-peer only communication. This ability to dynamically create an infrastructure connection provides additional function to the communication connection and is especially applicable to situations where the additional functions of the infrastructure mode are desired and the slightly degraded performance of the infrastructure mode can be tolerated.

The present invention may alternate between connection modes, depending on changing network conditions. For example, the cost of a direct peer to peer connection can change, thus making the indirect connection more attractive, cost-wise. As another example, the present system could choose to use a direct connection between a sender and a receiver, then that sender could later add multiple receivers. At some point, it could be less expensive for the sender to send a single message using the indirect method (where all of the receivers could get the message from the infrastructure) rather than having the sender send the message explicitly to each of them.

In the present invention, the sender has multiple options open, both in terms of message route and in message cost reducing techniques. It can use a larger "send message" time window to detect multiple copies of the same message going to different locations, at which point, it could decide to use a publish/subscribe model of communication, or perhaps a multi-cast form of communication, depending on which was rated better by the ranking function.

The present invention may be embodied in a utility program such as a message pathway selection utility program. The present invention also provides means for the user to identify an optimum pathway for a message transmission by first specifying a set of criteria for determining an optimum pathway and then invoking the message pathway selection utility to determine the optimum pathway.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
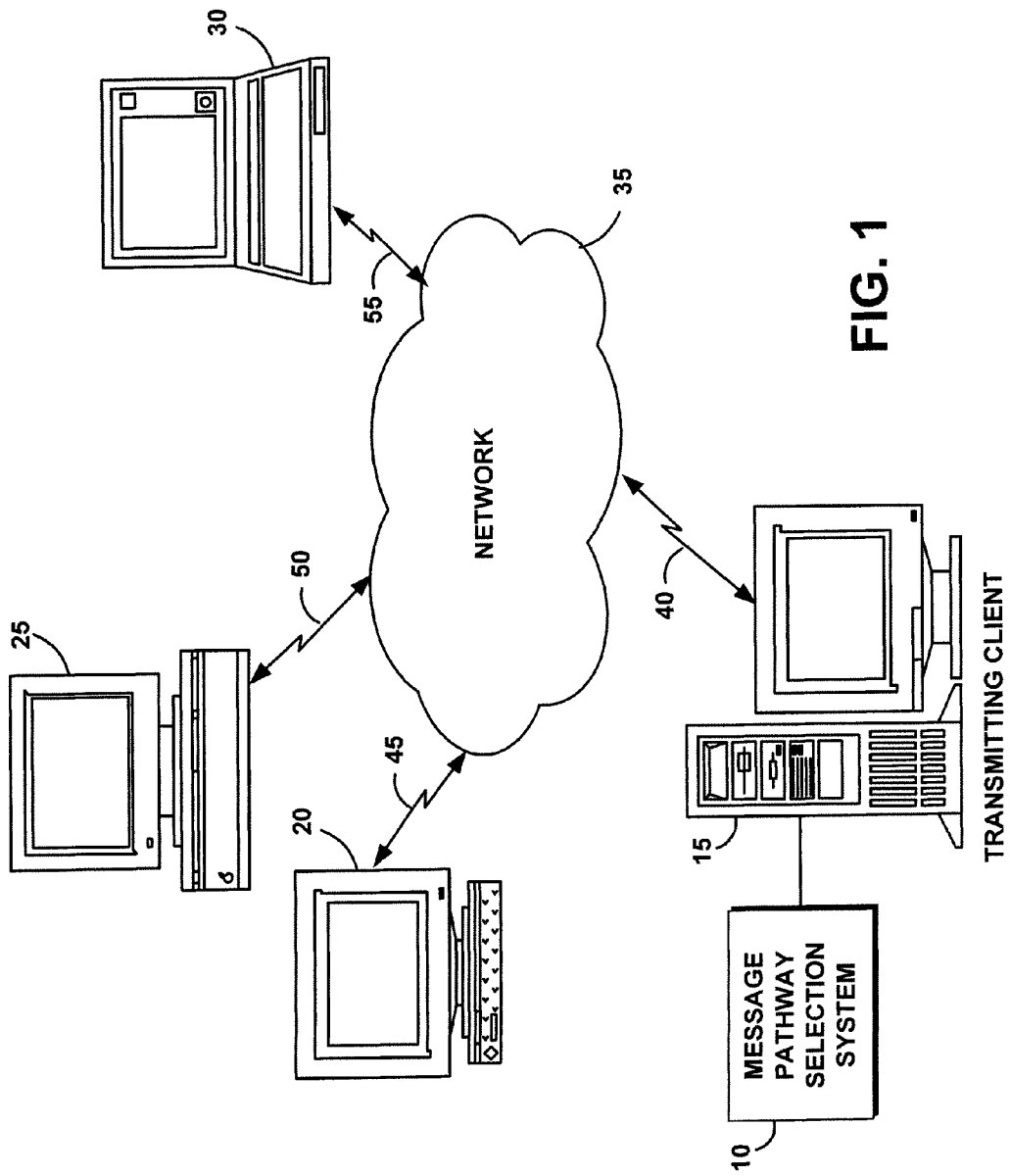
FIG. 1 is a schematic illustration of an exemplary operating environment in which a message pathway selection system of the present invention can be used.

FIG. 1 portrays an exemplary overall environment in which a system and associated method for dynamically selecting an optimum message pathway (the "system 10") according to the present invention may be used. System 10 comprises a software programming code or a computer program product that is typically embedded within, or installed on a host server 15 (further referenced herein as a sending client 15). Alternatively, system 10 can be saved on a suitable non-transitory storage medium such as a diskette, a CD, a hard drive, or like devices.

One or more recipients of messages transmitted by the sending client 15 are represented by a variety of computers such as computers 20, 25, 30, and can access the host server 15 through a network 35. Messages comprise data in the form of instructions, registration information, documents, files, video, audio, or any other form of data that can be transmitted electronically. Computers 20, 25, 30 each comprise software that allows the computers 20, 25, 30 to interface securely with the host server 15. The host server 15 is connected to network 35 via a communications link 40 such as a telephone, cable, or satellite link. Computers 20, 25, 30, can be connected to network 35 via communications links 45, 50, 55, respectively. While system 10 is described in terms of network 35, computers 20, 25, 30 may receive messages from the sending client 15 locally rather than remotely. The sending client 15 may send messages using system 10 either manually, or automatically through the use of an application.

Figure 2:
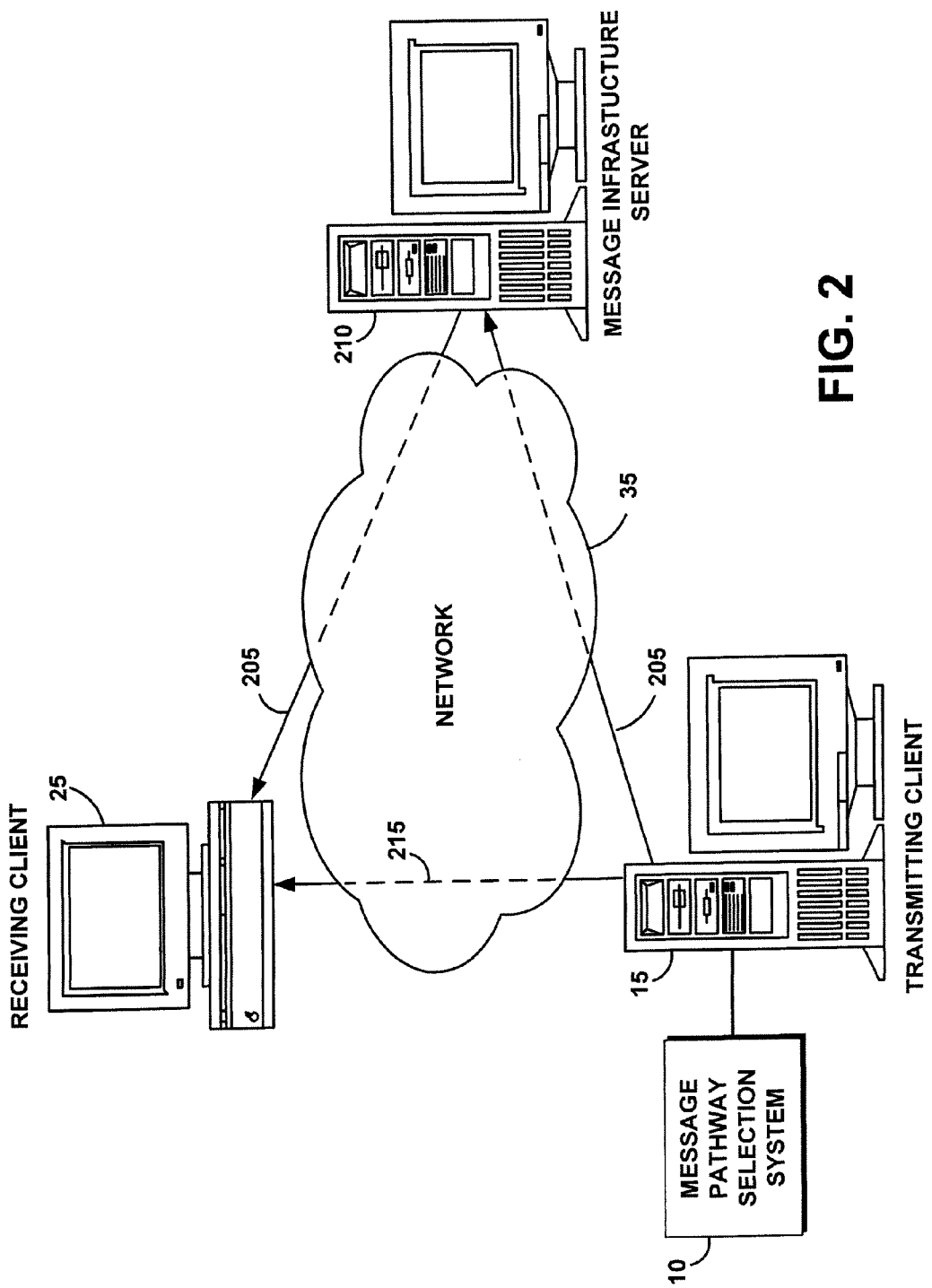
FIG. 2 is schematic illustration of an exemplary operating environment in which the message pathway selection system of FIG. 1 is shown with an message infrastructure server.

FIG. 2 illustrates an exemplary operating environment illustrating exemplary options for message pathway selection by system 10. Computer 25 (further referenced herein as the receiving client 25) illustrates a generic receiving client that receives messages from the sending client 15.

System 10 can select an infrastructure message pathway 205 via a message infrastructure server 210. The message infrastructure server posts received messages on a virtual message board or "whiteboard". Messages posted on the whiteboard can be retrieved by intended recipients such as, for example, the receiving client 25. The infrastructure message pathway 205 can be established using, for example, a virtual message board on which messages are posted by the sending client 15 and retrieved by the receiving client 25. Exemplary message based infrastructures that may be used by the message infrastructure server 210 comprise the TSPACES®, MQ SERIES®, LINDA®, and JAVASPACES® infrastructure messaging systems, or any other technology based on tuplespaces. A further exemplary message based infrastructure utilizes, for example, an e-mail protocol.

System 10 can further select a direct message pathway 215 that transmits a message directly to the receiving client 25. The direct message pathway 215 can be established using any direct or point-to-point protocol that does not require a messaging based infrastructure such as, for example, the message infrastructure server 210. Exemplary protocols comprise, for example, TCP, UDP, IP broadcast technology, etc. Further protocols that can be used for the direct message pathway 215 comprise any network protocol that does not use a message based infrastructure such as, for example, cell phone protocols, etc.

Additional protocols that can be used for the direct message pathway 215 over IP networks comprise multicast. Using multicast, the sending client 15 establishes a data stream onto network 35. The data stream established by the sending client 15 may have many recipients. The receiving client 25 retrieves messages directly off the data stream.

Figure 3:
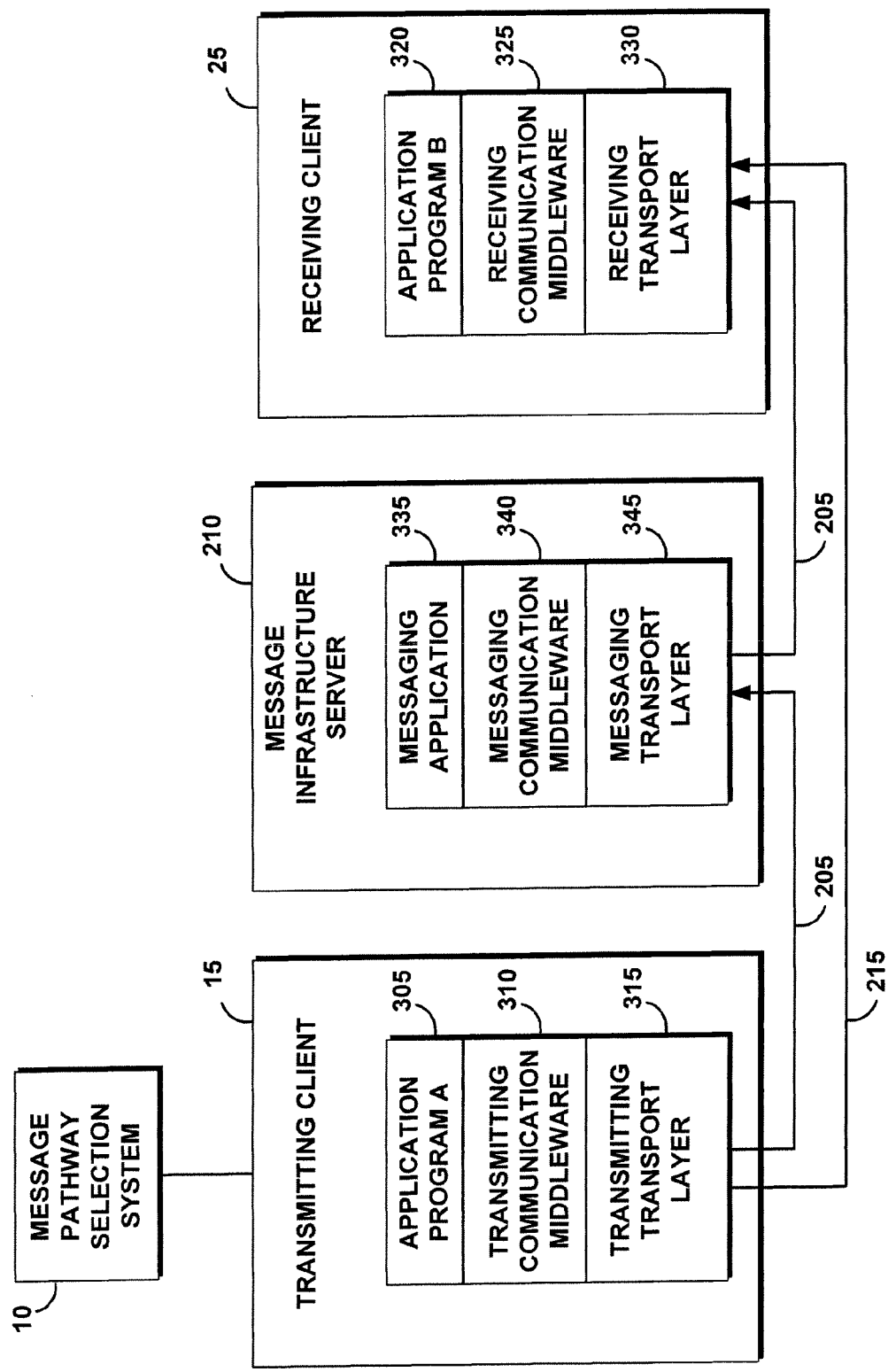
FIG. 3 is a block diagram illustrating communication between an application program on a sending client and an application program on a receiving client in which a mode of the communication occurs as dynamically selected by the message pathway selection system of FIG. 1.

FIG. 3 illustrates a block diagram of the sending client 15, the message infrastructure server 210, and the receiving client 25. The sending client 15 comprises an application program A, 305, a transmitting communication middleware 310, and a transmitting transport layer 315. The transmitting communication middleware 310 provides ability to the sending client 15 and system 10 to transmit messages using either the direct message pathway 215 or the infrastructure message pathway 205.

The receiving client 25 comprises an application program B, 320, a receiving communication middleware 325, and a receiving transport layer 330. The receiving communication middleware 320 provides ability to the receiving client 25 to receive or obtain messages using either the direct message pathway 215 or the infrastructure message pathway 205. The message infrastructure server 210 comprises a messaging application 335, a messaging communication middleware 340, and a messaging transport layer 345.

System 10 is installed in the transmitting communication middleware 310. Utilizing system 10, the transmitting communication middleware 310 dynamically selects an optimum message path. In one embodiment, system 10 is installed in the application program A, 305. As the application program A, 305, is preparing and sending data or messages, the application program A, 305, utilizes system 10 to dynamically select an optimum message path.

Figure 4A:
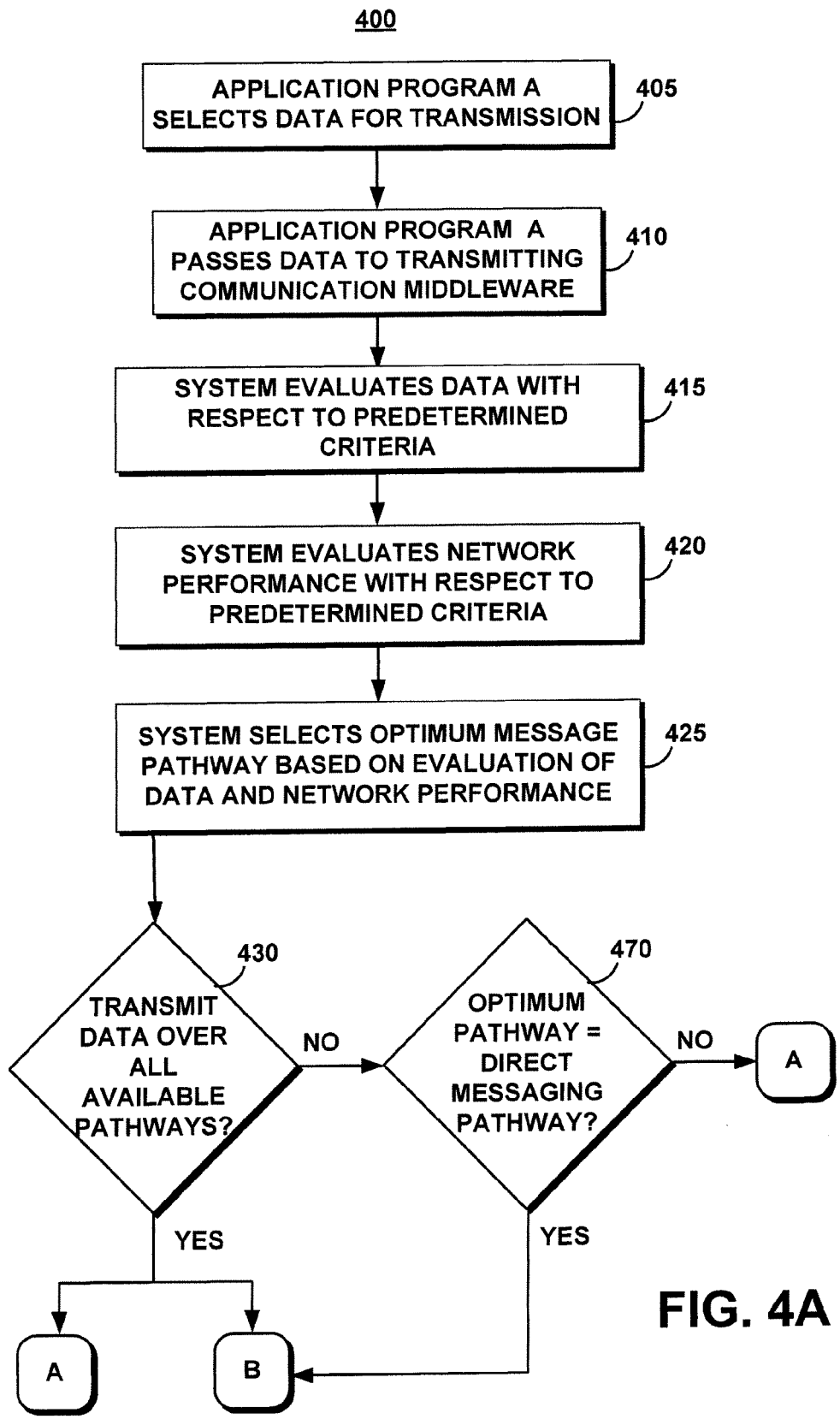
FIG. 4 comprises FIGS. 4A, 4B, and 4C and represents a process flow diagram illustrating a method of operation of the message pathway selection system of FIG. 1.
Figure 4B:
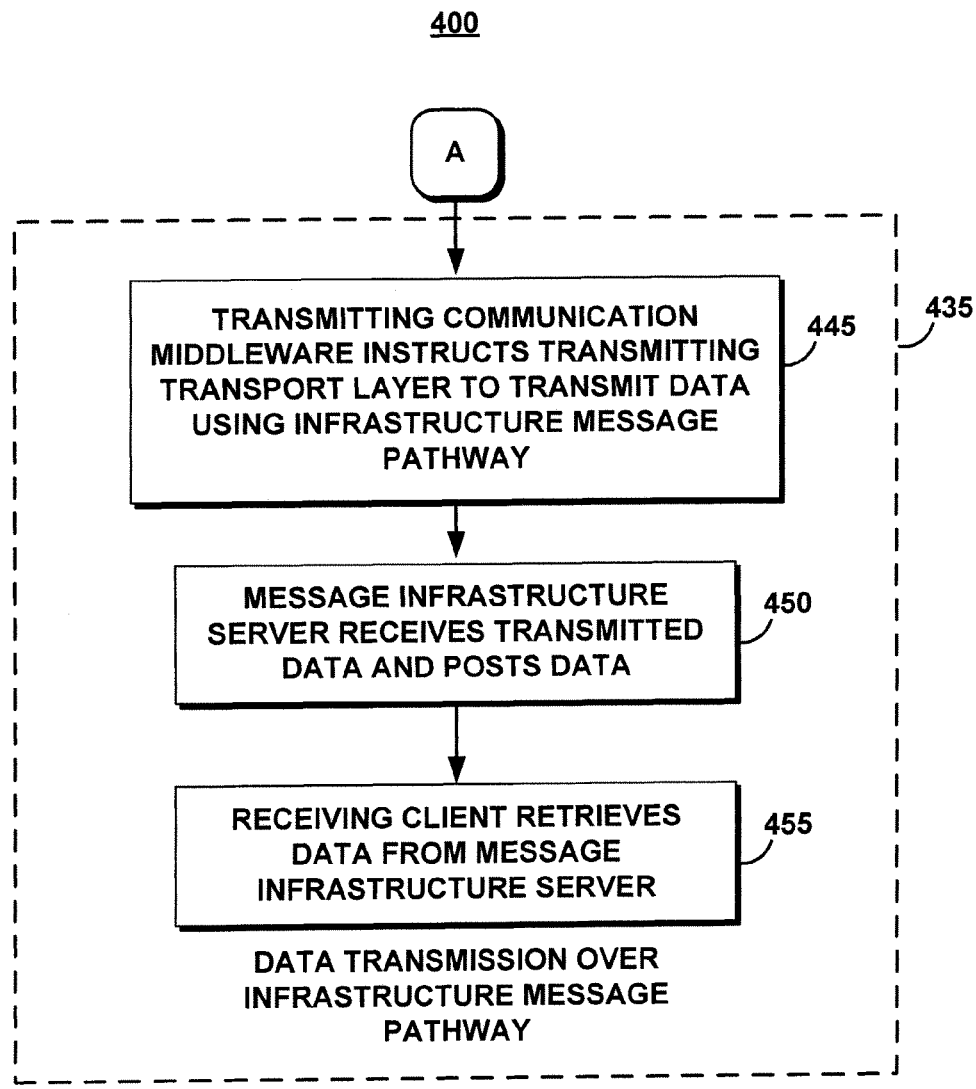
Figure 4C:
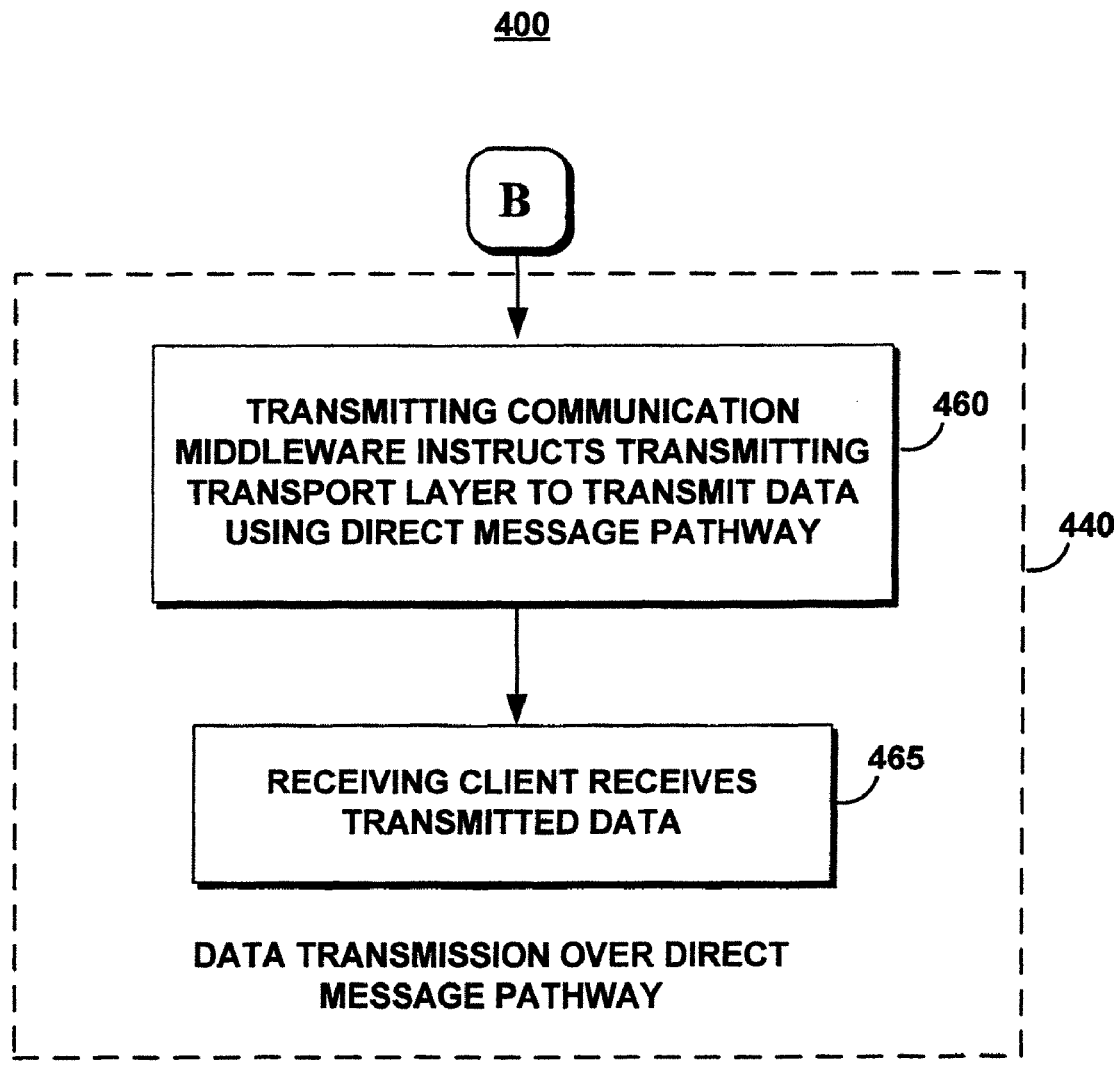

FIG. 4 (FIGS. 4A, 4B, 4C) illustrates a method 400 of operation of system 10 in selecting an optimum messaging pathway for transmission of messages using one or more predetermined criteria. The application program A, 305, selects data for transmission (step 405). The application program A, 305, passes the selected data to the transmitting communication middleware 310 (step 410). System 10 evaluates the selected data with respect to predetermined criteria (step 415). System 10 evaluates performance of network 35 with respect to predetermined criteria (step 420).

According to the predetermined criteria evaluated in step 415 and step 420, system 10 may determine to transmit the selected data over all available pathways (decision step 430). In this case, system 10 directs the transmitting transport layer 315 to transmit in parallel the selected data over the infrastructure message pathway 205 (represented by method 435 in FIG. 4B) and the direct message pathway 215 (represented by method 440 in FIG. 4C).

To transmit the selected data over the infrastructure message pathway 205 (method 435), the transmitting communication middleware 310 instructs the transmitting transport layer 315 to transmit the selected data using the infrastructure message pathway 205 (step 445). The message infrastructure server 210 receives the transmitted data and posts the transmitted data on, for example, a virtual whiteboard (step 450). The receiving client 25 retrieves the posted data from the message infrastructure server 210 (step 455).

To transmit the selected data over the direct message pathway 215 (method 440), the transmitting communication middleware 310 instructs the transmitting transport layer 315 to transmit the selected data using the direct message pathway 215 (step 460). The receiving client 25 receives the transmitted data (step 465). The mechanism used for the direct connection may depend on the agreement between the sender and the receiver. In the event of a video stream, for example, where speed matters and reliability do not, simple UDP (unreliable datagram protocol) packets could be used. In other cases, a simple TCP/IP conversation (e.g. Sockets, or Object Streams) could be used.

Otherwise, at decision step 430, system 10 selects an optimum message pathway based on the evaluation of data and network performance. If the selected optimum pathway is the direct message pathway (decision step 470), system 10 directs the transmitting transport layer 315 to transmit the selected data over the direct message pathway 215 (represented by method 440 in FIG. 4C). If the selected optimum pathway is not the direct message pathway 215 (decision step 470), system 10 directs the transmitting transport layer 315 to transmit the selected data over the infrastructure message-pathway 205 (represented by method 435 in FIG. 4B).

In one embodiment, system 10 is installed in the application program A, 310. In this embodiment, system 10 evaluates the selected data, evaluates performance of network 35, and selects an optimum message pathway (step 415, step 420, and step 425) prior to passing the selected data to the transmitting communication middleware 310 (step 410).

As the receiving client 25 receives messages from the direct message pathway 215 and the infrastructure message pathway 205, the communication change is transparent to the application program B, 320. The receiving communication middleware 325 hides the details of the message route from the application program B, 320.

Criteria used by system 10 in determining an optimum message pathway comprise examining a tag placed on the selected data by the application program A, 305. Such a tag comprises a specific request by the application program A, 305, to use a specified message pathway. A tag can comprise an identification of the selected data as, for example, control data, bulk data, low priority data, high priority data, data requiring an audit trail, data not requiring an audit trail, video, text, etc. System 10 comprises a database of tags and an optimum pathway associated with those tags. System 10 can, for example, select the direct message pathway 215 for high priority data. Moreover, system 10 can, for example, select the infrastructure message pathway 205 for data requiring an audit trail where the message infrastructure server 210 can generate an audit trail.

Criteria for determining an optimum message pathway further comprises the type of data selected for transmission. For example, system 10 can select different optimum message pathways for structured data than unstructured data, or multimedia data can be routed differently than text data.

System 10 can use size of the selected data as criteria for selecting an optimum message pathway. For example, large messages such as, for example, messages over the size 1 MB can be transmitted using the direct message pathway to increase data transfer speed of the selected data. This criterion can be further specified as a size limit based on a type of data.

Criteria used by system 10 further comprise performance of network 35, performance of the message infrastructure server 210, usage load, etc. System 10 comprises a feedback system that actively monitors performance of network 35 and performance of the message infrastructure server 210. System 10, for example, chooses to route the selected data on the direct message pathway 215 when network 35 is busy or when the message infrastructure server 210 is busy.

For example, application program A, 305, has selected data that a user wishes to make sure is transmitted to five other computers. Network 35 is reporting a lot of outages. If the selected data is transmitted using the direct message pathway 215, some of the computers may not receive the selected message. Consequently, system 10 selects the infrastructure message pathway 205 because the message infrastructure server 210 posts the selected data in a persistent manner. If network 35 is down, the intended recipients of the data cannot retrieve the data. However, when network 35 comes back up, the intended recipients of the data can connect to the message infrastructure server 210 and retrieve the selected data.

Another criterion used by system 10 in selecting the optimum message pathway is confidentiality of the data to be transmitted. The direct message pathway 215 can be more secure than the infrastructure message pathway 205 because data transmitted over the direct message pathway 215 can be encrypted and directed to specified recipients. However, the transmitting client 15 and the receiving client 25 can negotiate transfer of an encrypted message using the message infrastructure server 210.

System 10 can use a logging criterion in selecting the optimum message pathway. Data that requires logging is directed by system 10 to the message infrastructure server 210. Any data that is posted can be copied to a one more databases to generate an archive of transmitted data.

System 10 can use a cost criterion in selecting the optimum message pathway. System 10 can select the optimum message pathway to minimize transfer costs of the selected data. System 10 can further use as a criterion the number of recipients the selected data has. Selected data with a large number of recipients may be more economically transmitted over the infrastructure messaging pathway 205 or over the direct messaging pathway 215 using broadcast technology.

Depending on the criteria evaluated by system 10, system 10 may select both the infrastructure message pathway 205 and the direct message pathway 215. For example, a specific type of data may require fast transfer over the direct message pathway 215 and an audit trail as provided by the message infrastructure server 210.

An exemplary use of system 10 is a hospital that uses a network such as that shown in FIG. 1 to transmit and selectively log data. Medical data that comprised specific treatments ordered by a physician or specific findings observed by a physician can be directed by system 10 to the infrastructure message pathway 205. The message infrastructure server 210 records this medical data to a medical log for archiving and for protection, for example, against malpractice suits. However, bulk data such as an X-ray picture exceeds a predetermined size criterion and is directed by system 10 to the direct message pathway 215 for transmission to a desktop computer or hand-held tablet of the doctor.

While system 10 is described for illustration purposes only in relation to sending or transmission of messages or data, it should be clear that system 10 is applicable as well to messages or data that are acknowledged or guaranteed of delivery and to messages or data that are not acknowledged or not guaranteed of delivery.

Furthermore, while system 10 is described for illustration purposes only in relation to transmitting of messages or data to a recipient server, it should be clear that system 10 is applicable as well to directing transmission of messages or data any number of additional computers using a variety of techniques such as, for example, IP multicast.

It is to be understood that the specific embodiments of the invention that have been described are merely illustrative of certain applications of the principle of the present invention. Numerous modifications may be made to a system, method, and service for dynamically selecting an optimum message pathway described herein without departing from the spirit and scope of the present invention.

What is claimed is:

1. A method of selecting a preferred pathway, the method comprising:
    generating a message by an application, the message to be transmitted from a transmitting client, as a source, to a receiving client, as a destination;
    tagging the message with a tag based on attributes included in the message; automatically determining said destination based on the tag;
    automatically determining, based on said destination, at least some of a plurality of available pathways whose extent is defined between said transmitting client and said receiving client;
    evaluating network performance;
    using the tag and the evaluation of network performance, to select, for said message, said preferred pathway from among said plurality of available pathways, based on a predetermined agreement between the transmitting client and the receiving client, transparently to the application, said plurality of available pathways including an infrastructure messaging pathway through an infrastructure messaging server, and further including a direct messaging pathway that bypasses said server;
    delivering said message to said destination over said preferred pathway including posting the message to the infrastructure messaging server if the preferred pathway is the infrastructure messaging pathway, such that the message is retrievable by the receiving client at a later time when the receiving client connects to the infrastructure messaging server to retrieve the data, and directly delivering the message to the receiving client via a peer-to-peer connection between the transmitting client and the preferred pathway is the direct messaging pathway, wherein selecting the preferred delivery pathway comprises two or more preferred pathways to deliver the message to the destination; and
    transmitting the message in parallel over the infrastructure messaging pathway and the direct messaging pathway, by a transmitting communication middleware;
    distributing the message over the two or more preferred pathways based on the message content; and
    posting the message on a virtual message board.

2. The method of claim 1, wherein automatically determining the message destination comprises any one of:
    using a message content; and
    the destination provided by the application.

3. The method of claim 1, wherein the plurality of available pathways comprise any one or more of:
    direct communication pathways; and
    indirect communication pathways.

4. The method of claim 3, wherein the direct communication supports at least one or more of the following communication modes:
    broadcast;
    multicast;
    peer-to-peer;
    multi-receive; and
    publish or subscribe.

5. The method of claim 1, wherein the plurality of available pathways comprises a pathway configured for indirect communication, and the indirect communication supports a messaging system.

6. The method of claim 1, further comprising, upon delivery of the message to the destination, storing the preferred pathway for the delivery and integrating the preferred pathway as part of a criteria for determining the preferred pathway.

7. The method of claim 1, further comprising ranking the available pathways based on a ranking function; and
    integrating ranking results of the available pathways as part of a criteria for determining the preferred pathway.

8. The method of claim 7, wherein ranking the available pathways comprises using any one or more of:
    considering the attributes of the message;
    considering attributes of the application; and
    considering attributes of the available pathways.

9. The method of claim 8, wherein, in considering the message attributes, the message attributes comprise any one or more of:
    message size;
    message encryption; and
    message content, wherein the message content comprises any one or more of: audio, video, and text data.

10. The method of claim 8, wherein, in considering the application attributes, the application attributes comprise any one or more of:
    application security;
    performance requirement;
    delivery guarantee requirement; and
    latency of the application.

11. The method of claim 8, wherein, in considering the attributes of the available pathways, the attributes of the available pathways comprise any one or more of:
    whether the available pathway provides acknowledgment of message delivery;
    quality of the available pathway;
    latency of the available pathway;
    rate of data transmission over the available pathway;
    cost of using the available pathway;
    congestion of the available pathway;
    security of the available pathway;
    reliability of the available pathway;
    type of data that the available pathway can transmit; and
    reachability over exiting firewall protocols.

12. The method of claim 1, wherein the two or more preferred pathways comprise a secure pathway and an insecure pathway.

13. The method of claim 1, further comprising integrating the message at the message destination.

14. The method of claim 1, wherein the message destination comprises any one of: a single destination point or a plurality of destination points.

15. The method of claim 1, further comprising continuously monitoring the attributes of the message; and
alternating between the infrastructure messaging pathway and the direct messaging pathway, as needed, for delivering the message to said destination.

16. The method of claim 1, further comprising confirming the message fidelity at the destination.

17. A computer program product comprising a plurality of executable instruction codes stored on a non-transitory computer-readable medium comprising:
instruction codes for dynamically selecting, from a plurality of available pathways using a computer processor, a preferred pathway along which to transmit a message from a source to a destination based on one or more criteria;
instruction codes for generating the message;
instruction codes for automatically determining the message destination;
instruction codes for identifying whether the message comprises multimedia data or text data;
instruction codes for automatically determining at least some of the plurality of available pathways based on the message destination;
instruction codes for selecting said preferred pathway from among said plurality of available pathways, wherein the selection is based on whether the message comprises multimedia data or text data, said selection configured for defaulting to a particular one of said at least some of the plurality of available pathways when a network connection is stable;
instruction codes for transmitting the message in parallel over a plurality of available pathways, including posting the message to an infrastructure messaging server if the preferred pathway is an infrastructure messaging pathway, so that the message is retrievable by a receiving client at a later time when the receiving client connects to the infrastructure messaging server to retrieve the data, and directly delivering the message to the receiving client via a peer-to-peer connection between a transmitting client and the receiving client if the preferred pathway is a direct messaging pathway;
instruction codes for transmitting an audit trail over the infrastructure messaging pathway after the message is transmitted by the direct messaging pathway;
instruction codes for hiding the message route from the application program; and
instruction codes for delivering the message to the destination over the preferred pathway, any packet embodying the message and to be delivered on a direct communication pathway, as said preferred pathway, containing a source address and a destination address, said preferred pathway being defined between said source address and said destination address.

18. A message pathway selection system for comprising:
a host server containing a transmitting client application for generating a message to be transmitting from a source to a destination;
a message infrastructure server for identifying confidential data in the message if the confidential data is present in the message;
a transmitting communication middleware for automatically determining the message destination based on a presence of the confidential data;
the transmitting communication middleware for automatically determining at least some of the plurality of available pathways based on the message destination;
the transmitting communication middleware for identifying whether the message comprises multimedia data or text data;
the transmitting communication middleware for automatically determining at least some of the plurality of available pathways based on the message destination;
the transmitting client application using the presence of the confidential data and network conditions, to perform a dynamic selection of a preferred pathway from a plurality of available pathways, wherein the selection is based on whether the message comprises multimedia data or text data, said selection configured for defaulting to a particular one of said at least some of the plurality of available pathways when a network connection is stable, transparently to the application, said dynamic selecting being configured to alternate its choice between direct messaging pathway mode and infrastructure messaging pathway mode while said transmitting client application is communicating with said destination by means of the mode to be switched; and
a transmitting transport layer for delivering the message in parallel over a plurality of available pathways to the destination including the preferred pathway, including posting the message to a message infrastructure messaging server if the preferred pathway is an infrastructure messaging pathway, so that the message is retrievable by a receiving client at a later time when the receiving client connects to the message infrastructure messaging server to retrieve the data, and directly delivering the message to the receiving client via a peer-to-peer connection between a transmitting client and the receiving client if the preferred pathway is a direct messaging pathway, without delivering the message by any other of said plurality of available pathways, said system being configured for utilizing said transmitting transport layer for said delivering of said message regardless of which of said available pathways is selected as said preferred pathway,
wherein the preferred pathway is the direct messaging pathway if the confidential data is present within the message, and
wherein the preferred pathway is the infrastructure messaging pathway if
the confidential data is not present within the message; and
the transmitting transport layer for transmitting an audit trail over the infrastructure messaging pathway after the message is transmitted by the direct messaging pathway; and
the transmitting transport layer for hiding the message route from the application program.

19. A service for dynamically selecting a preferred pathway comprising:
a host server containing an application generating a message to be transmitted from a source to a destination;
a message pathway selection system, automatically determining the message available client-to-client pathways based on the message destination, and using a number of recipients associated with the message to select the preferred pathway from the plurality of available client-to-client pathways based on whether the message comprises multimedia data or text data, transparently to the application, said message pathway selection system, further with respect to the transparent selection, continuously monitoring performance of a network communicatively connecting the clients, including performance of an infrastructure messaging server, in making said preferred pathway, and being configured for selecting as said selection a pathway serving as a backup in the event of a fault on a previously-selected pathway, said selection configured for defaulting to a particular one of said at least some of the plurality of available pathways when a network connection is stable; and the message pathway selection system delivering the message in parallel over a plurality of available pathways including the preferred pathway to the destination, the delivering including posting the message to the infrastructure messaging server if the preferred pathway is an infrastructure messaging pathway, so that the message is retrievable by a receiving client at a later time when the receiving client connects to the infrastructure messaging server to retrieve the data, and directly delivering the message to the receiving client via a peer-to-peer connection between a transmitting client and the receiving client if the preferred pathway is a direct messaging pathway, wherein the preferred pathway is determined between the infrastructure messaging pathway and the direct messaging pathway depending on a number of recipients in the message;

the message pathway selection system transmitting an audit trail over the infrastructure messaging pathway after the message is transmitted by the direct messaging pathway;

the message pathway selection system hiding the message route from the application program; and the message pathway selection system delivering the message to the destination over the preferred pathway, any packet embodying the message and to be delivered on a direct communication pathway, as said preferred pathway, containing a source address and a destination address, said preferred pathway being defined between said source address and said destination address.

* * * * *